US009903083B2

(12) United States Patent
Lindholm et al.

(10) Patent No.: US 9,903,083 B2
(45) Date of Patent: Feb. 27, 2018

(54) DEVICE FOR COLLECTING OIL

(71) Applicant: LAMOR CORPORATION AB, Porvoo (FI)

(72) Inventors: Jan-Erik Mikael Lindholm, Gäddrag (FI); Stephen J. Reilly, Exeter, RI (US)

(73) Assignee: Lamor Corporation AB, Porvoo (FI)

( * ) Notice: Subject to any disclaimer, the term of this patent is extended or adjusted under 35 U.S.C. 154(b) by 26 days.

(21) Appl. No.: 14/771,746

(22) PCT Filed: Feb. 27, 2014

(86) PCT No.: PCT/FI2014/050147
§ 371 (c)(1),
(2) Date: Aug. 31, 2015

(87) PCT Pub. No.: WO2014/131948
PCT Pub. Date: Sep. 4, 2014

(65) Prior Publication Data
US 2016/0017561 A1     Jan. 21, 2016

(30) Foreign Application Priority Data

Mar. 1, 2013  (FI) ..................................... 20135193

(51) Int. Cl.
*E02B 15/04* (2006.01)
*E02B 15/10* (2006.01)
*B63B 35/32* (2006.01)

(52) U.S. Cl.
CPC .............. *E02B 15/10* (2013.01); *B63B 35/32* (2013.01); *E02B 15/046* (2013.01);
(Continued)

(58) Field of Classification Search
CPC . E02B 5/046; E02B 5/048; E02B 5/10; E02B 5/103; E02B 5/106; B63B 35/32
(Continued)

(56) References Cited

U.S. PATENT DOCUMENTS 3,326,379 A * 6/1967 Caddick ................ E02B 15/046
210/242.1
4,060,487 A * 11/1977 Samsel ................. E02B 15/046
210/242.3
(Continued)

FOREIGN PATENT DOCUMENTS

CA     1242655 A    10/1988
FI      834264 A     5/1985
(Continued)

OTHER PUBLICATIONS

International Search Report and Written Opinion for corresponding International Application No. PCT/FI2014/050147, dated Jun. 4, 2014.
(Continued)

*Primary Examiner* — Christopher Upton
(74) *Attorney, Agent, or Firm* — Alston & Bird LLP

(57) ABSTRACT

Provided is a device for collecting oil contained in ice. The device includes a lifting device fixed for example to a vessel, a cage of separation adapted to be lowered into the water between the ice blocks by means of the lifting device and formed by a box which lets water and oil but substantially no ice, and an oil collector for collecting the oil on the water surface in the space defined by the separation of cage.

17 Claims, 4 Drawing Sheets

(52) U.S. Cl.
CPC .......... *E02B 15/048* (2013.01); *E02B 15/103* (2013.01); *E02B 15/106* (2013.01)

(58) Field of Classification Search
USPC ... 210/170.05, 170.09, 170.11, 242.3, 747.6, 210/776, 923
See application file for complete search history.

(56) References Cited

U.S. PATENT DOCUMENTS

| | | | |
|---|---|---|---|
| 4,747,361 A | | 5/1988 | Lundin |
| 4,831,955 A | | 5/1989 | Lundin |
| 5,173,182 A | * | 12/1992 | Debellian .............. E02B 15/046 210/242.3 |
| 6,540,925 B2 | * | 4/2003 | Takahashi .......... B01D 17/0214 210/242.3 |
| 7,303,688 B2 | * | 12/2007 | Pertile ................... E02B 15/103 210/242.3 |
| 8,343,358 B2 | * | 1/2013 | Immonen ................ B63B 35/32 210/170.05 |
| 8,404,122 B1 | * | 3/2013 | Quaglino, Jr. ........ E02B 15/046 210/242.3 |
| 2003/0132154 A1 | * | 7/2003 | Morin .................... B63B 35/32 210/242.1 |
| 2011/0278217 A1 | * | 11/2011 | Inoue ..................... B01D 29/44 210/499 |
| 2015/0218768 A1 | * | 8/2015 | Sorstrom .............. E02B 15/046 405/60 |
| 2016/0186400 A1 | * | 6/2016 | Lindholm ............. E02B 15/104 210/170.05 |

FOREIGN PATENT DOCUMENTS

| | | |
|---|---|---|
| FI | 73029 | 8/1987 |
| FI | 75014 C | 4/1988 |
| FI | 80746 C | 7/1990 |
| FI | 106969 B | 5/2001 |
| FI | 112105 B | 10/2003 |
| WO | WO 00/53488 AI | 9/2000 |
| WO | WO 02/16699 AI | 2/2002 |

OTHER PUBLICATIONS

Office Action from corresponding Chinese Patent Application No. 201480011727.8 dated May 4, 2016.

* cited by examiner

DEVICE FOR COLLECTING OIL

FIELD

The invention relates to a device for collecting oil to recover oil present among ice.

BACKGROUND

To collect oil effectively from the surface of water is difficult. It is particularly difficult to collect oil during winter from among ice blocks. Whether it be docks, natural shores or open water, it is not possible to collect oily ice blocks; instead, the oil must be separated from ice in the water before recovery. The prior art is disclosed in patent publications FI106969, FI80746, FI75014 and FI73029. These all encompass the same principle, i.e. the vessel includes a sloping screen surface driven towards an oily mass of ice blocks so as to force the ice deeper while the oily water freed from the ice is provided onto the screen surface. The oil can then be recovered in the normal way.

The problem in the solutions of the prior art is the rigidity and inadaptability as to the use of the devices. The vessel is just steered straight forward and only a strip as wide as the screen surface can be cleared in the area that needs to be cleared. In narrow shipping routes, in docks and by the shores, the vessels are more likely to just stir the oily mass of ice, and effective clearing is far from being achieved. In addition, the reversing and returning over and over makes the operation very slow and ineffective.

SUMMARY

The objective of the invention is to remedy the above-mentioned defects of the prior art. Specifically, the objective of the invention is to disclose a novel device for collecting oil, by means of which the oil can be collected from among ice blocks quickly, effectively and thoroughly.

The device for collecting oil according to the invention is designed for collecting oil to a vessel or other suitable space from among ice, i.e. for clearing the oil from a mass formed by water, ice blocks and oil. The device according to the invention includes a lifting device supported for example to a suitable means of transportation, such as a vessel, and a separating cage to be lowered by means of the lifting device to the water so as to be provided among the ice, the separating cage being formed by a casing that lets water and oil but substantially no ice through. Further according to the invention, an oil collector that collects oil on the surface of water is disposed in the space defined by the separating cage. This way, according to the invention, the separating cage including the oil collector is not directly dependent on the movements of the vessel; instead, the device is controlled by the crane of the vessel. Depending on the structure, reach and operation of the crane being used, the separating cage can be moved and repositioned relatively flexibly on different sides of the vessel and even over large surface areas without having to move the vessel back and forth to a significant degree.

The separating cage for use is preferably a downwardly closed yet upwardly open space. In other words, its lower part encompasses a structure that lets water and oil but no ice through. As it is upwardly open, the oil collector that operates in the space defined by the separating cage is also freely accessible. This way, the operation of the collector may be under continuous control, and the supply of the necessary energy for operation as well as removal of the collected oil can be easily carried out. Preferably, the oil collectors used in the structures according to the invention are skimmers based on the rotating brush technique. However, other types of known collectors are also possible.

In one embodiment of the invention, the casing of the separating cage is formed by a straight trough surface consisting of parallel curved ribs that are transverse relative to the longitudinal direction of the trough and disposed at a distance from one another. The curved adjacent ribs form a long trough, to the interior space of which the ice blocks do not have access as the trough is descended to a specific depth in icy and oily water. Only water and oil flow between the ribs into the space in which the oil that floats on the surface of water is separated from water by the oil collector. The ends of the trough may be completely closed, or the ends may also be made of a suitable mesh or rib structure which operates as described above, only letting water and oil through. The curved ribs may be circular arches or shapes of a variable curvature. The trough angle of the trough-shaped structure may be up to 180°, but generally it is sufficient to have a trough angle of 45-90°.

Preferably, the ribs of the separating cage are rigid and angular and/or sharp-edged in cross-section. As they are rigid and sufficiently thick, they resist the pressure of the ice without bending. Furthermore, as their profile is sufficiently sharp-edged, they prevent the ice blocks from being wedged between the ribs, which would easily occur if the ribs were round-shaped.

Preferably, in the rib structures for use, the ribs are fixed to a common framework only at the ends, i.e. they are not fixed to each other between the ends. Thus, the ribs do not contain any transverse grid structures that would prevent or impair the movement and gliding of ice along the outer surface of the ribs. This enables easy gliding of ice and easy and flexible movability of the entire separating cage even in a thick mass of ice. In very large separating cages, if there is no other way to make the long ribs sufficiently rigid, they can be supported to each other in a crosswise configuration by the upper surfaces of the ribs, so that their lower surfaces that contact the ice still remain slick and parallel to each other.

In one structural solution of the invention, the trough-shaped separating cage includes a swinging suspension for supporting it to a lifting device to turn the separating cage in the longitudinal direction of the ribs. This way, the trough can be oriented directly downwards when descended perpendicularly into water. On the other hand, it may be tilted towards the direction of movement so that the curved base receives the approaching ice as the trough is moved along the oily and ice-block-laden surface of water. This movement may be effected by the movement of the vessel, a movement provided by the lifting device alone or by suitably combining both movements at the same time.

In another embodiment of the invention, the casing of the separating cage is formed by a conical or cap surface that tapers down from a closed frame of an upper part. The closed frame may be round-shaped or polygonal and it may contain a straight and non-tapering portion also provided with a rib structure that lets oil and water but no ice through. The conical or cap surface that extends from the underside thereof is formed by rigid ribs that extend down from the frame and join each other at the lower part of the surface.

Furthermore, in connection with the oil collector disposed in the center of the frame there is preferably a water flow arrangement, such as a propeller, by means of which the oil-containing water to be cleared among the ice is made to circulate down through the separating cage from the surface of water. This way, water but no ice is made to circulate through the frame to the oil collector and further out through the conical surface. The device can be easily lowered to a mass of ice in difficult and even narrow places, as the downward-tapering structure enables easy penetration thereof among the ice. Even in narrow spaces, water is made to circulate between the ice blocks, and so, even for a relatively large area, the oily water is made to flow through the clearing.

Preferably, in the separating cage according to the invention, whether it be a straight trough-shaped structure or a cylindrical and conical structure, the ribs are disposed substantially in parallel, and at least so that the device is moved in parallel to the ribs in the oily ice. This way, as the trough-shaped structure is advanced on the surface of icy water or as the conical and cylindrical structure is descended into water, the ice blocks are able to glide in parallel to the ribs while the water and oil flow into the collecting space between the ribs. This way, the device is easy and lightweight to be moved among the ice blocks, so that the ice blocks glide smoothly along the ribs without bringing about any vortexes that would mix water and oil. The smooth and vortex-free gliding of ice outside the ribs ensures smooth and steady flow of water and oil towards the collecting space between the ribs. This smooth flow in turn ensures that the skimmers or other such collectors operate effectively.

Preferably, in different embodiments of the invention, moving of the separating cage can be used so as to make the ice that surrounds and contacts the cage to move, rock, tremble etc. so that any oil adhered to the surface of ice is released and separated from the ice to the surface of water. The moving may be merely the lifting, lowering and sideways movement of the device by a crane being used. The moving may also be swinging of the separating cage back and forth for example by means of a hydraulic cylinder coupled thereto. In one embodiment, the separating cage is provided with a vibration feature by which the ice in contact thereto is vibrated. The vibration may be carried out in a manner known per se for example by a suitable cam or hydraulic circuit.

The lifting devices necessary for the invention may be different types of cranes. For example, the lifting device may be a gantry crane that extends in the rear of the vessel substantially over the entire width thereof and that is pivoted so that it can be turned over the stern behind the ship, so as to make the separating cage suspended therefrom to extend back from the stern of the ship for a distance defined by the height of the gantry crane. The lifting devices may also be different kinds of swing jib cranes used on ships, which may also be provided with jibs that are longitudinally adjustable in a telescopic manner.

ADVANTAGES PROVIDED BY THE INVENTION

The device for collecting oil according to the invention has considerable advantages as compared to the prior art. The device for collecting oil according to the invention is not bound to any specific crane and does not necessarily need its own crane or even its own vessel; instead, it can be used as different versions on different types of ships and vessels, as long as they are provided with a lifting device with a sufficient lifting capacity and reach. This is a significant difference in comparison to the prior art, wherein structures for separating the ice have been built specifically for a vessel. However, the separating device according to the invention may be delivered even by air to any vessel provided with a suitable crane and immediately deployed without any greater installation procedures at the occurrence of an oil spill.

The invention allows diverse oil collecting possibilities that can be accommodated to the current conditions. The trough-shaped long separating cage may be lowered into water behind the vessel and the vessel can be steered backwards, so that the device collects oil over the entire length of the separating cage, i.e. of the ship in general. If the separating cage is disposed on a long swing jib at the stern of the ship, the separating cage can be swept back and forth from left to right and back even over an area that is significantly larger than the width of the ship. In narrow spaces, the conical separating cage can be used to focus the collection precisely on the desired points without a need to move the cage by using the flow of water in that connection.

BRIEF DESCRIPTION OF THE DRAWINGS

Below, the device for collecting oil according to the invention will be described in detail with reference to the accompanying drawings, in which.

DETAILED DESCRIPTION

Figure 1:
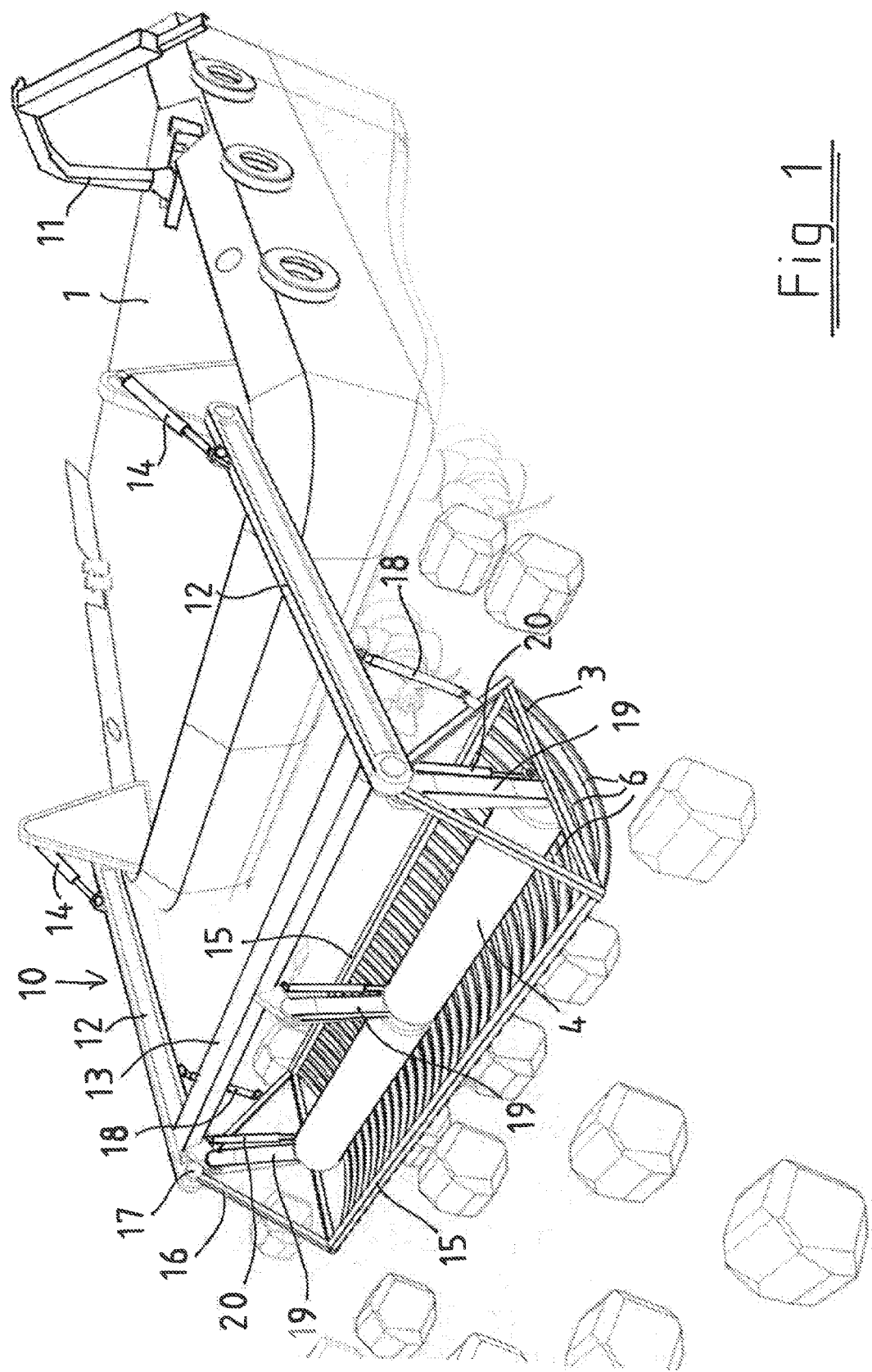
FIG. 1 shows a perspective view of one device for collecting oil according to the invention.
Figure 2:
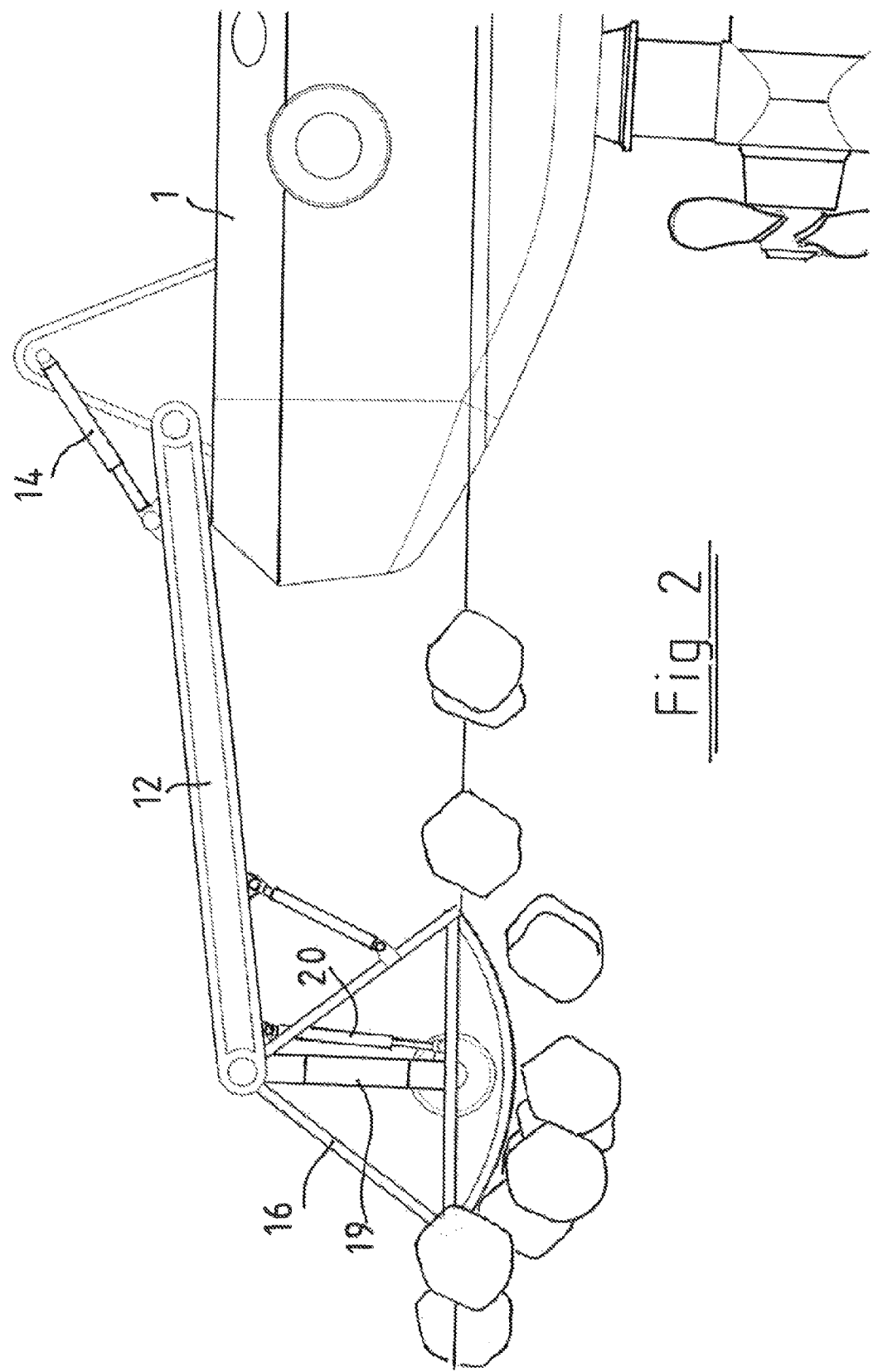
FIG. 2 shows a side view of the operating position of the device for collecting oil of FIG. 1.
Figure 3:
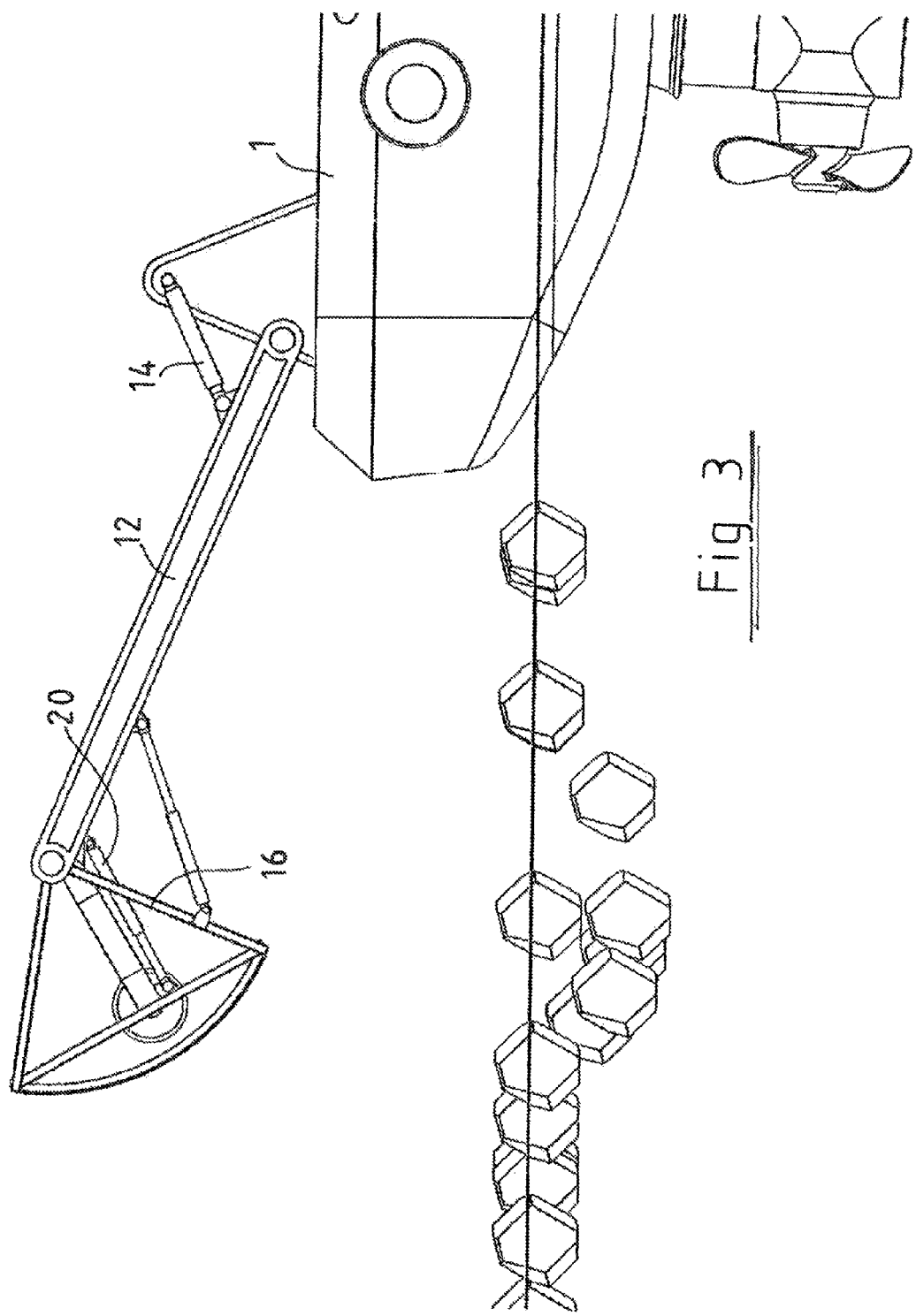
FIG. 3 shows a side view of another position of the device for collecting oil of FIG. 1

FIG. 1-3 illustrate one device for collecting oil according to the invention. It includes a gantry crane 10 that operates as a lifting device 2 and that is positioned in the rearmost part of the stern deck of a vessel 1. The gantry crane includes uprights 12 pivoted on the back corners of the deck and a beam 13 that connects them at the upper end. The uprights may be raised and lowered by hydraulic cylinders 14 coupled to the lower ends thereof between an operating position of FIG. 2 and a stock position of FIG. 3. By means of a suitable lever structure and working length of the hydraulic cylinders, it is also possible to arrange the gantry crane to be turned fully vertically or even in the other direction on the deck.

A separating cage 3 with an oil collector 4 is pivotally supported to the upper end of the uprights 12. The separating cage is formed by an elongated trough surface 5, the length of which in this embodiment approximately equals to the width of the vessel 1. The trough surface consists of a large number of curved and parallel ribs 6 disposed side by side and at a small distance from one another and attached at the ends to a common support framework 15. The distance of the ribs from one another is preferably of the order of a few centimeters so that this ribbed grill would not let any ice blocks but only water and oil through.

The ends of the support framework 15 are supported to pivots 17 at the ends of the uprights 12 by diagonal supports 16 so that the entire separating cage 3 is able to swing about a horizontal axis in parallel to the pivots 17. In addition, hydraulic cylinders 18 attached to the uprights are coupled to the diagonal supports 16 to turn the separating cage 3 at a required angle about said horizontal axis in a controlled manner.

Further, supporting arms 19 are supported to the upper end of the gantry crane 10 above the separating cage so as to support inside the trough surface of the separating cage an oil collector 4, i.e. a skimmer, consisting of a brush that is as long as the trough and of the rotating means, comb structure, oil pumping means and other necessary parts in connection with the brush which are known per se and which are not illustrated in any more detail in the figure. In addition, hydraulic cylinders 20 are connected to the skimmer disposed on the supporting arms 19 for turning and moving the skimmer along a path that corresponds to the curvature of the trough surface 5 at a suitable distance above the trough surface. It is also possible that the supporting arms have a longitudinal adjustment option so that the hydraulic cylinder 20 can be adjusted so as to adjust the distance of the brush of the skimmer from the trough surface.

The device for collecting oil according to the invention as illustrated in FIG. 1-3 is used as follows. As oil is present on the surface of water among ice blocks, the device for collecting oil is lowered to the level of the surface of water by means of the gantry crane so that the separating cage substantially, but not entirely, is descended into water. This way, it pushes away ice blocks in front of it and only water and oil remain inside the separating cage, so that the oil can be removed by the skimmer 4. If the booms of the gantry crane are provided with length adjustment, the device can be moved on the surface of water while the vessel 1 stays in place. However, in general the vessel is reversed, i.e. the separating cage 3 is moved on the surface of water so as to push away the ice in front of to the underside thereof, i.e. the ice glide along the lower surface of the ribs of the separating cage and pass the separating cage from below while the oily water flows through the separating cage. This way, the oily water that flows through the cage contacts the rotating skimmer which removes oil from the flow, and only cleared water exits the separating cage to the ice blocks that have passed from the underside.

Depending on the conditions, i.e. the amount of oil, characteristics of the mass of ice and driving speed, the separating cage can be tilted at different angles to prevent the access of ice into the separating cage. Furthermore, the separating cage may be raised and lowered or shaken and vibrated or the skimmer may be moved in the separating cage for optimal recovery of oil as required by the conditions.

In FIG. 1, a telescopic boom crane 11 is disposed on one edge of the deck of the vessel. The device for collecting oil now disposed on the gantry crane at the stern of the vessel may as well be disposed on this boom crane 11, so that, as the vessel is moving, the separating cage 3 that extends perpendicularly outwards from its side allows a strip of icy water as wide as the vessel to be cleared also on the side of the vessel. Especially in narrow places and when the vessel is in place, the big and far-reaching boom crane allows sweeping of even large curved surfaces clear from oil.

Figure 4:
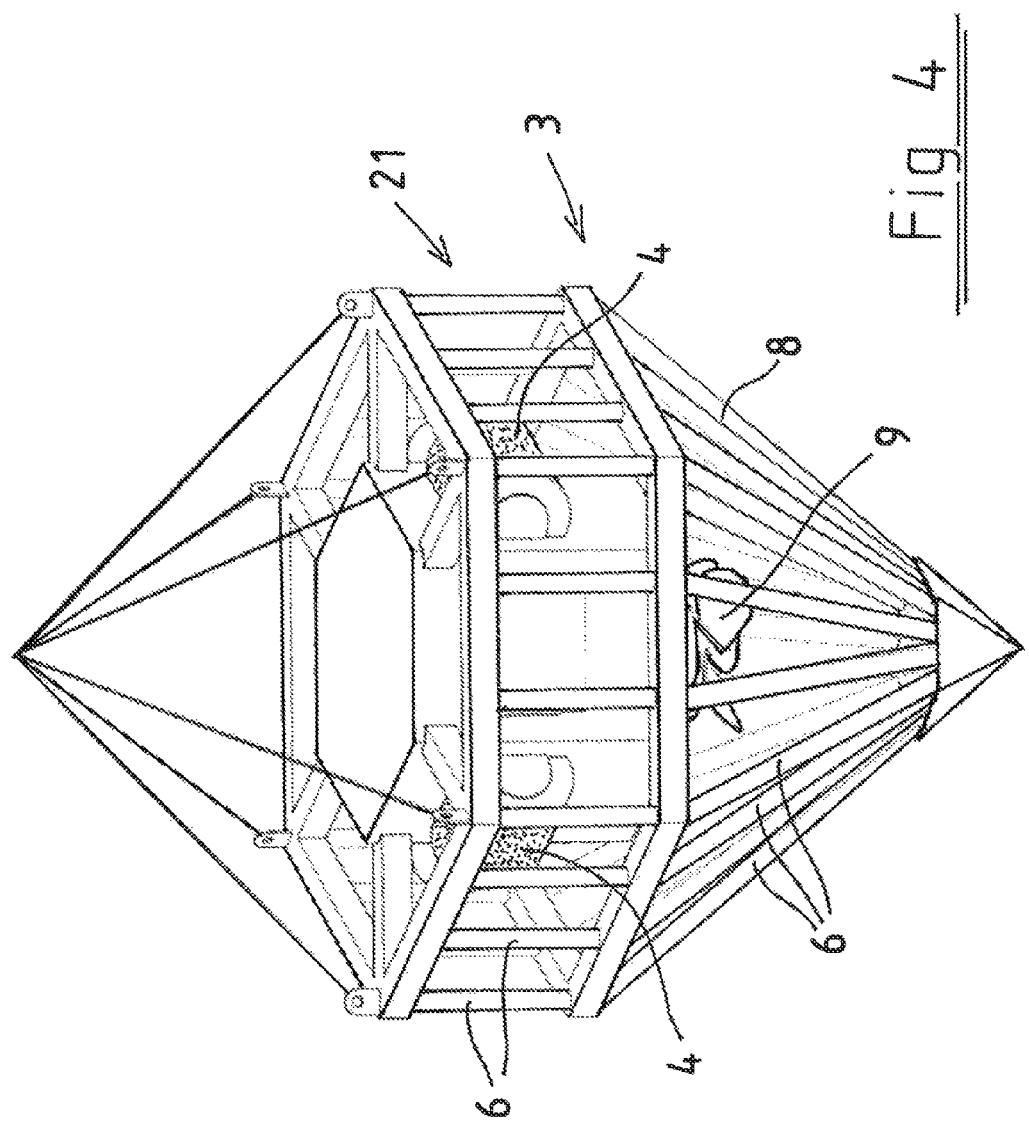
FIG. 4 shows a perspective view of another device for collecting oil according to the invention.

FIG. 4 illustrates another device for collecting oil according to the invention. It is specifically developed and designed for use with the telescopic boom crane 11 of FIG. 1. It includes a conical surface 8 that forms the separating cage 3 and a cylindrical frame 21 thereabove. They both consist of a number of adjacent rigid and straight ribs 6. The ribs in the cylindrical frame are parallel to one another and to the axis of the cylinder. In the conical surface, the ribs extend evenly and at even intervals from the edge of the cylinder toward the tip of the cone. The ribs 6 are suitably spaced from one another so that only water and oil are able to pass therethrough, whereas the ice blocks are always left outside the cage. It is to be noted that, for clarity purposes, the ribs in the figure are disposed at relatively long intervals.

In other words, the lower end of the conical surface 8 is relatively sharp, so descending the device into icy water does not cause problems; instead, it moves easily between ice blocks. In the upper part of the device, i.e. in the area of the cylindrical frame 21, inside the cage there are oil collectors 4, i.e. in this embodiment three skimmers at regular intervals. Below the skimmers, on the central axis of the conical area, there is a propeller as a water flow arrangement 9. It allows the water to be circulated through the separating cage so as to make the water to be cleared to flow effectively through the rotating brushes of the skimmers.

The device for collecting oil according to the invention as illustrated in FIG. 4 is used as follows. Although the device of FIG. 4 may also be moved in slush, it is mainly designed for use in one place. In this case, the conical separating cage is lowered by a crane to the required place surrounded by contaminated water and ice. The device is lowered to such a depth that the water surface is level with the cylindrical frame 21 at a suitable operating height for the skimmers 4. Then, by rotating the skimmers and by rotating the propeller 9 thereunder the contaminated water is made to circulate so as to make oil and surface water radially to flow from all around the device towards the separating cage and through the ribs to the brushes of the skimmer, whereas the ice stay behind the ribs. The propeller sucks and forces down the cleared water. This way, contaminated and cleared water are not mixed; instead, a strong and steady flow toward the collector is provided over a large area in the oily surface layer of water among the ice. Particularly in narrow and limited places, such as docks, the device allows very good and extensive clearing results even by operating from one point. On the other hand, the device can be very simply and quickly moved from one place to another by a boom crane.

It is therefore characteristic of the devices for collecting oil according to the invention that they are not bound to the vessels being used. They are neither provided as fixed parts of the vessels nor shaped or designed in any other way exclusive to a specific vessel. This way, the device for collecting oil according to the invention is extremely versatile in use and applicable for use in any vessel as long as it has a suitable lifting device. Thus, the use of the device in oil accidents does not require an oil combatting vessel; instead, it can be quickly delivered to the accident site even by a helicopter and deployed hours or even days before the arrival of an oil combatting vessel.

In addition, it is to be noted that the device is also excellently applicable for use on land, i.e. when clearing quay and shore areas, the crane for use may be a truck crane or for example a dockside ship-to-shore crane normally used for loading ships. However, for simplicity purposes, the invention has been mainly described as a device used on ships, while its structure and operation remain the same also in the land operation mentioned above.

The invention has been described above by way of example with reference to the accompanying drawings without limiting the invention merely to the illustrated structures in any way. Various embodiments of the invention are possible within the scope defined by the claims.

The invention claimed is:
1. A device for collecting oil among ice comprising:
   a lifting device configured to be supported by a means of transportation;

a separating cage configured to be lowered into water among the ice by means of the lifting device and formed by a casing that lets water and oil but substantially no ice through; and an oil collector configured to collect oil on the surface of water in the space defined by the separating cage, wherein the lifting device is a gantry crane comprising uprights, and the gantry crane extends in a rear part of a vessel substantially over an entire width thereof to be turned over a stern, wherein the separating cage extends over an entire width of the gantry crane, and the separating cage is pivotally supported to upper ends of the uprights, wherein the casing of the separating cage is formed by a trough surface consisting of parallel ribs that are transverse relative to the longitudinal direction of the trough and disposed at a distance from one another, and wherein the separating cage includes a swinging suspension configured to support the separating cage to the lifting device to turn the separating cage in the longitudinal direction of the ribs.

2. The device for collecting oil according to claim 1, wherein the oil collector is a skimmer based on the rotating brush technique.

3. The device for collecting oil according to claim 1, wherein the ribs are rigid and angular and/or sharp-edged in cross-section.

4. The device for collecting oil according to claim 1, wherein the separating cage includes a moving feature configured to release oil from ice blocks that contact the ribs outside the separating cage.

5. The device for collecting oil according to claim 4, wherein the moving feature is vibration or swinging.

6. The device for collecting oil according to claim 1, further comprising a telescopic boom crane supported on a deck of the vessel.

7. The device for collecting oil according to claim 1, wherein the ribs of the separating cage are substantially parallel to the movement of the separating cage in the ice, so that the ice glides along the outer surface of the separating cage in the direction of the ribs.

8. The device for collecting oil according to claim 1, wherein the lifting device is supported by the vessel.

9. A device for collecting oil among ice comprising:
a lifting device configured to be supported by a means of transportation;
a separating cage configured to be lowered into water among the ice by means of the lifting device and formed by a casing that lets water and oil but substantially no ice through; and
an oil collector configured to collect oil on the surface of water in the space defined by the separating cage,
wherein the casing of the separating cage is formed by a conical or cap surface that tapers down from a closed cylindrical frame of an upper part,
wherein the conical or cap surface and the closed cylindrical frame each comprise a plurality of adjacent and straight ribs; and
wherein the lifting device is a telescopic boom crane supported on a deck of a vessel.

10. The device for collecting oil according to claim 9, wherein the conical or cap surface is formed by rigid ribs that extend down from the frame and join each other in the lower part of the surface.

11. The device for collecting oil according to claim 9, wherein a water flow arrangement is provided in connection with the oil collector configured to circulate the water to be cleared down from among the ice on the water surface through the separating cage.

12. The device for collecting oil according to claim 11, wherein the water flow arrangement is a propeller.

13. The device for collecting oil according to claim 9, wherein the oil collector is a skimmer based on the rotating brush technique.

14. The device for collecting oil according to claim 9, wherein the separating cage includes a moving feature configured to release oil from ice blocks that contact the ribs outside the separating cage.

15. The device for collecting oil according to claim 14, wherein the moving feature is vibration or swinging.

16. The device for collecting oil according to claim 9, wherein the plurality of ribs of the closed cylindrical frame are parallel to each other and an axis of the closed cylindrical frame.

17. The device for collecting oil according to claim 9, wherein the plurality of ribs of the conical or cap surface extend evenly and at even intervals from an edge of the of the closed cylindrical frame to a tip of the conical or cap surface.

* * * * *